Dec. 18, 1956    H. O. SCHJOLIN ET AL    2,774,227
AIR CONDITIONING APPARATUS FOR BUSES AND THE LIKE
Filed July 23, 1953    5 Sheets-Sheet 1

INVENTOR.
Hans O. Schjolin and
Karl Schuster
BY R. R. Candor
Their Attorney

Dec. 18, 1956   H. O. SCHJOLIN ET AL   2,774,227
AIR CONDITIONING APPARATUS FOR BUSES AND THE LIKE
Filed July 23, 1953   5 Sheets-Sheet 2

INVENTOR.
Hans O. Schjolin and
Karl Schuster
BY R. R. Candor.
Their Attorney

Dec. 18, 1956 H. O. SCHJOLIN ET AL 2,774,227
AIR CONDITIONING APPARATUS FOR BUSES AND THE LIKE
Filed July 23, 1953 5 Sheets-Sheet 3
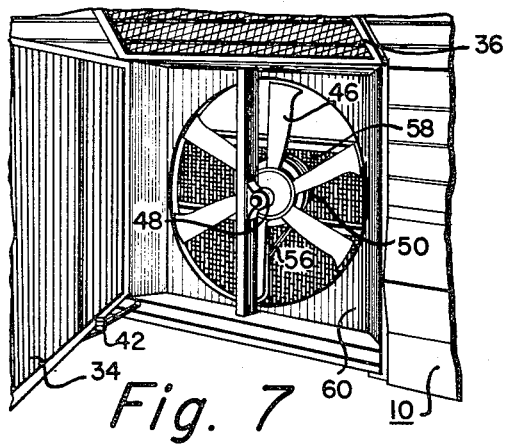
Fig. 7
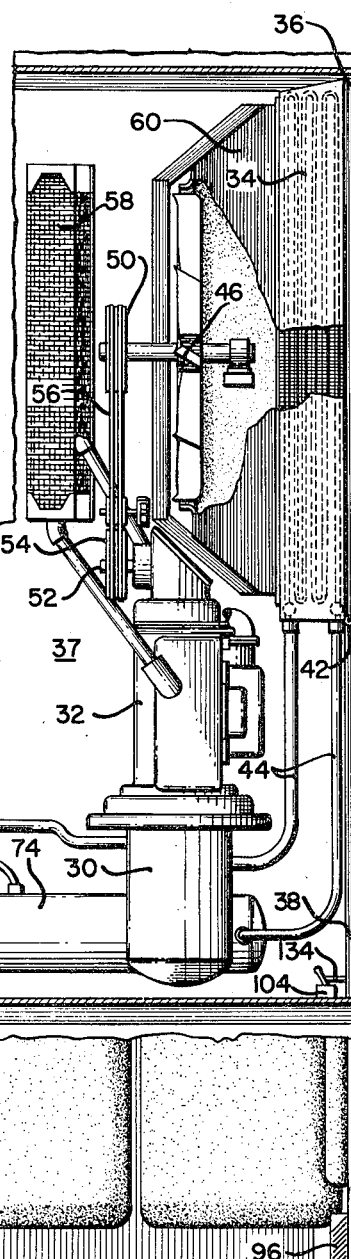
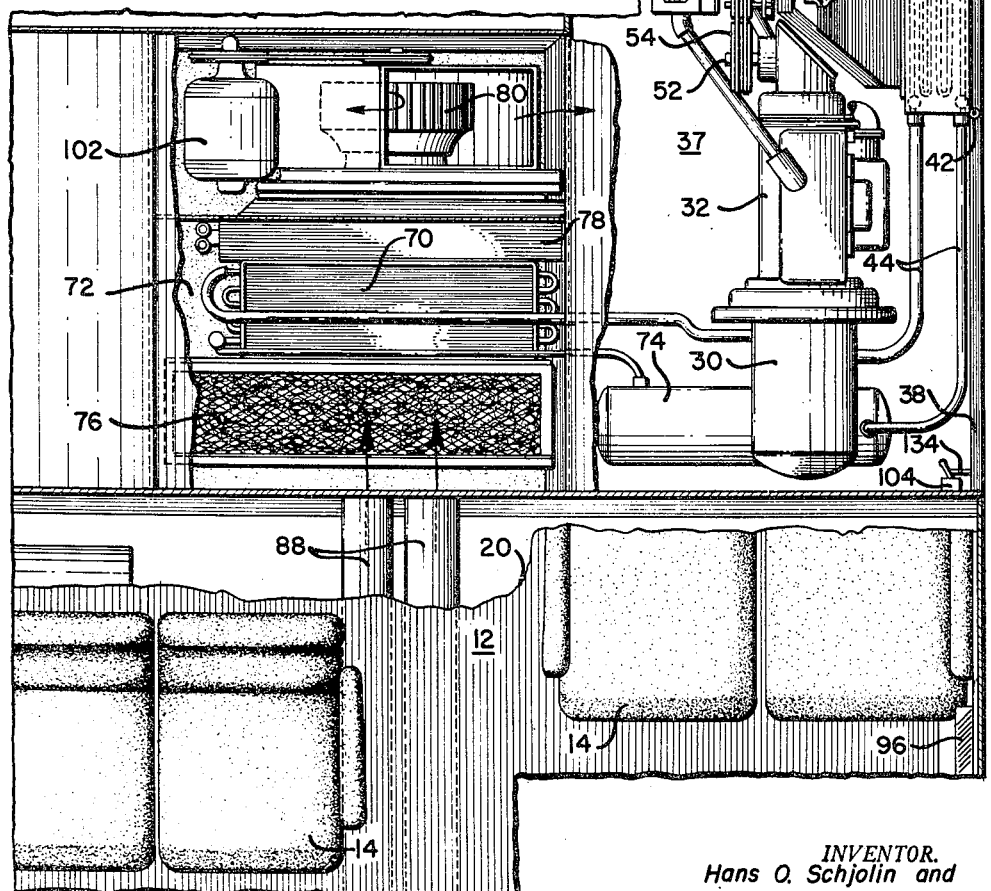
Fig. 6
INVENTOR.
Hans O. Schjolin and
Karl Schuster
BY R. R. Candor
Their Attorney

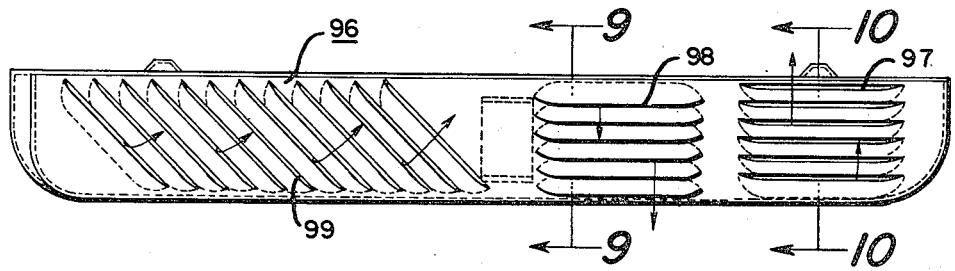
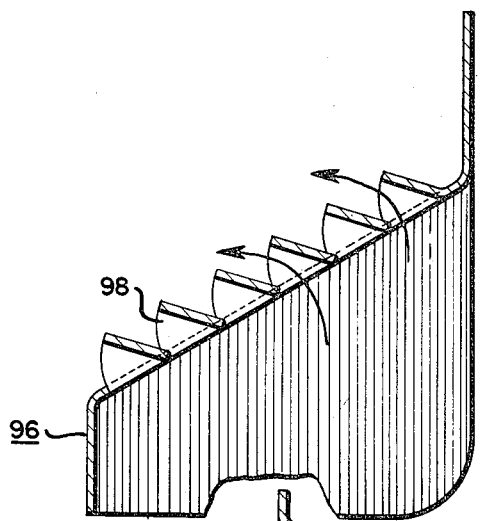
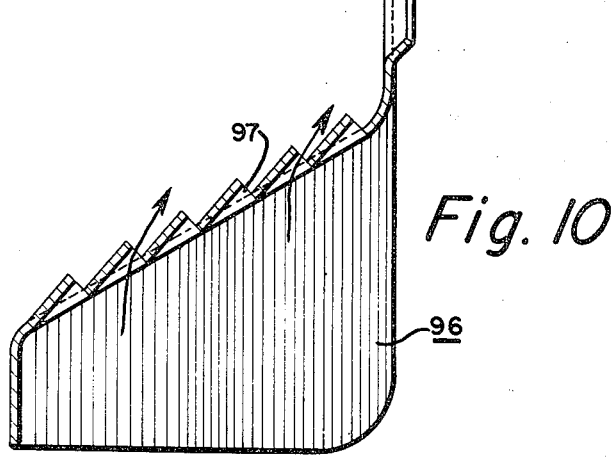

INVENTOR.
Hans O. Schjolin and
Karl Schuster
BY R. R. Candor
Their Attorney

United States Patent Office 2,774,227
Patented Dec. 18, 1956

2,774,227

AIR CONDITIONING APPARATUS FOR BUSES AND THE LIKE

Hans O. Schjolin and Karl Schuster, Birmingham, Mich., assignors to General Motors Corporation, Detroit, Mich., a corporation of Delaware Application July 23, 1953, Serial No. 369,910

10 Claims. (Cl. 62—117)

This invention relates to refrigerating apparatus and more particularly to an air conditioning system for use in a bus or the like.

It is an object of this invention to provide an air conditioning system which is of light weight yet rugged and capable of efficiently delivering an adequate amount of conditioned air to the passenger compartment of a modern bus.

Another object of this invention is to provide an air conditioning unit having an improved condenser cooling arrangement. More particularly it is an object of this invention to provide an air conditioning unit wherein a propeller type of fan is driven by the internal combustion engine which drives the compressor and wherein the fan shaft is arranged at right angles to the crankshaft of the engine.

A further object of this invention is to provide an improved arrangement for distributing the conditioned air within the passenger compartment of the bus.

Still another object of this invention is to provide a safety device which makes it possible to inspect and repair the engine without danger of anyone within the passenger compartment of the bus starting up the engine prematurely.

Further objects and advantages of the present invention will be apparent from the following description, reference being had to the accompanying drawings, wherein a preferred form of the present invention is clearly shown.

In the drawings:

Figure 6 is a fragmentary plan view with parts broken away to show the arrangement of the refrigeration equipment in the bus;

Figure 7 is a fragmentary perspective view showing the condenser cooling fan;

Figure 8 is a fragmentary plan view showing one of the air outlet grills;

Figure 9 is a sectional view taken substantially on line 9—9 of Figure 8;

Figure 10 is a sectional view taken substantially on line 10—10 of Figure 8.

Figure 1:
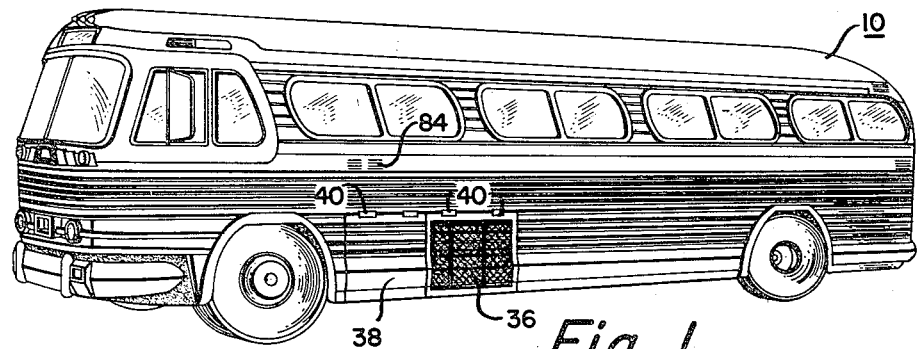
Figure 1 is a perspective view showing a bus equipped with the invention.

Referring now to the drawings wherein a preferred embodiment of the invention has been shown, reference numeral 10 generally designates a bus having a passenger compartment 12 in which two rows of seats 14 are located. The passengers enter the bus through a front doorway 16 directly opposite the driver's seat is accordance with well known practice. The usual stairwell 18 is provided adjacent the front door of the bus and this stairwell represents the lowest portion of the passenger compartment.

Figure 2:
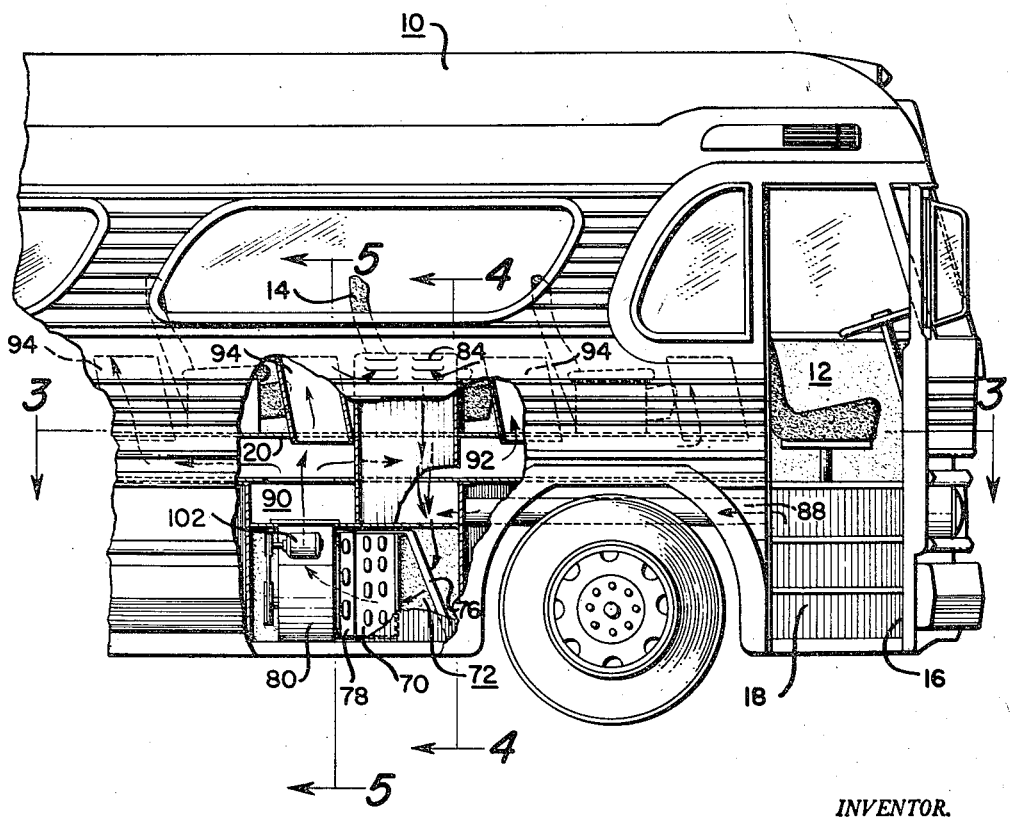
Figure 2 is a fragmentary side elevational view of the bus with parts broken away.

The air conditioning equipment for the bus is located beneath the bus floor 20 directly behind the front wheel cavities as best shown in Figures 1, 2 and 6. The refrigerant liquefying equipment is mounted on the left side of the bus and consists of a refrigerant compressor 30 driven by an internal combustion engine 32 and a condenser 34 located parallel to the side wall of the bus directly inside of the side air grill 36. The compressor 30, engine 32, and condenser 34 are mounted in a machinery compartment 37 which is provided with a first access door 38 which is adapted to be swung upwardly about suitable hinges 40 for inspection and repair of the mechanism within the compartment 37. The air grill 36 is also pivotally mounted by means of the hinges 40 so as to enable one to swing the air grill upwardly away from the condenser 34.

The condenser 34 is pivotally supported adjacent its one edge by means of a hinge 42 so as to enable one to swing the condenser out from the machinery compartment and thereby make it possible to thoroughly clean the condenser from both sides. The refrigerant lines 44 which connect the condenser to the rest of the refrigerant system are of the flexible type which permit this movement of the condenser relative to the other parts of the refrigeration system.

A large blade type fan 46 has been provided as shown in order to conserve on space and at the same time provide adequate circulation of condenser cooling air. This fan includes a shaft 48 provided with a driving pulley 50 on its one end. It will be noted that this fan shaft is arranged at right angles to the longitudinal axis of the compressor engine 32 and that the engine 32 is provided with a power take-off shaft 52 which projects at right angles to the crankshaft of the engine. This power take-off shaft 52 is provided with a pulley 54 as shown. Suitable belts 56 connect the pulleys 50 and 54 so that operation of the engine 32 causes operation of the fan 46. An engine radiator 58 is located the fan 46 and is adapted to be cooled by the same air stream which cools the condenser 34. The condenser cooling air preferably enters through the side air grill 36 and leaves through the bottom of the machinery compartment 37. A suitable fan shroud 60 is provided for separating the incoming air from the outgoing air.

Air to be conditioned is cooled by an evaporator 70 located in a separate compartment 72 located off at one side of the compartment 37 as best shown in Figure 6. This evaporator is connected in refrigerant flow relationship to the compressor 30, the condenser 34 and receiver 74 in accordance with standard refrigeration practice. A suitable filter 76 is provided at the inlet of the evaporator for filtering the incoming air. A heater coil 78 is also located in the compartment 72 alongside the evaporator 70 and is used for heating the air during the heating season. This coil could also be used for reheating the air cooled by the evaporator when it is desired to dehumidify the air without cooling the same to the fullest extent. The coil is connected to the water cooling system for the main bus engine in accordance with standard practice. A fan 80 is mounted in the compartment 70 and serves to circulate the air to be conditioned through the compartment 72.

Figure 3:
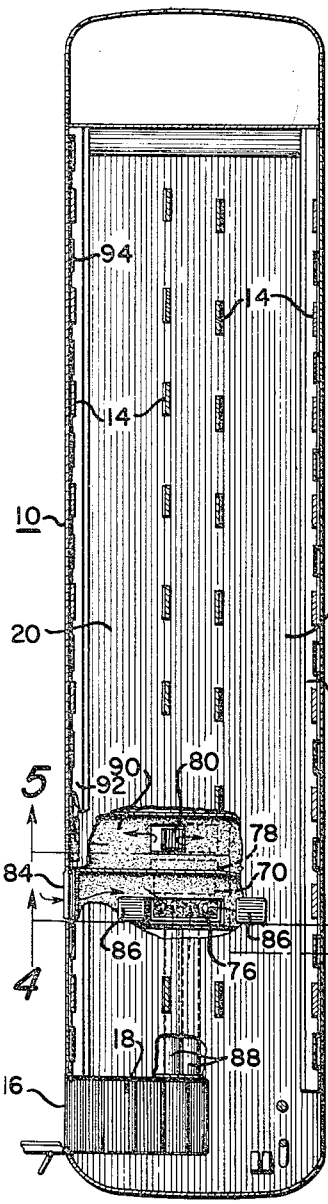
Figure 3 is a plan view of the bus with parts broken away showing the arrangement of the air ducts.
Figure 4:
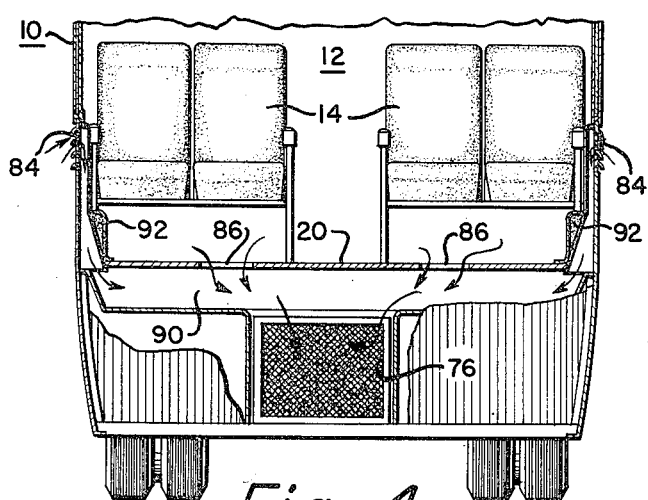
Figure 4 is a fragmentary sectional view taken substantially on line 4—4 of Figures 2 and 3.
Figure 5:
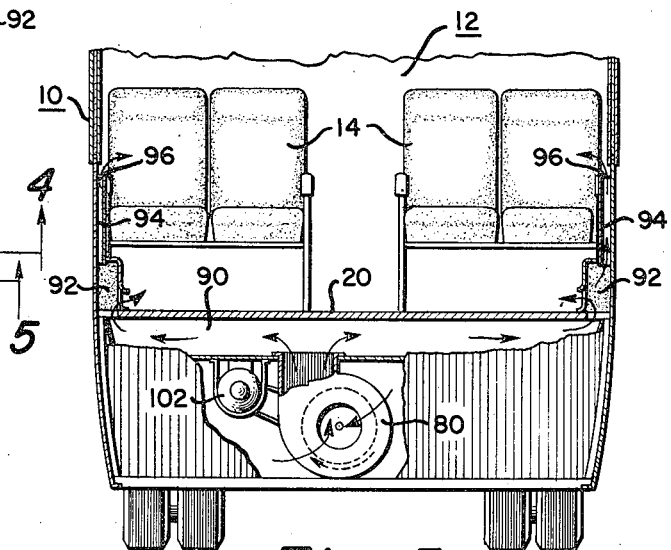
Figure 5 is a fragmentary vertical sectional view taken substantially on line 5—5 of Figures 2 and 3.

A best shown in Figures 2 and 4, the air to be conditioned consists of fresh air which enters the compartment through side air inlets 84 located directly beneath the side windows of the bus and recirculated air which returns to the air conditioning compartment through return air inlets 86. For purposes of illustration these return air inlets have been shown located in the floor of the bus directly beneath the seats of the bus. A portion of the return air is withdrawn from the stairwell 18 through air conduits 88 which lead from the stairwell to the air conditioning compartment as best shown in Figures 2 and 3.

The conditioned air is discharged by the fan 80 through a transversely extending duct 90 which leads to side air distributing ducts 92 which extend substantially the full length of the passenger compartment adjacent the lower corners thereof. These ducts in turn communicate with a plurality of vertically extending ducts 94 which serve to convey the conditioned air upwardly to outlet grills 96 located substantially at lap height between the seats. As illustrated in Figures 8, 9 and 10, these grills are provided with three sets of louvers 97, 98 and 99 which are designed to direct the conditioned air leaving each grill into three different directions. The louvers 97 direct a first portion of the conditioned air upwardly against the adjacent window. The louvers 98 direct a second portion of the air substantially horizontally across the occupant's lap and the louvers 99 are arranged at an angle to direct a portion of the air rearwardly and upwardly along the side wall. It has been found that this duct and grill arrangement serves to efficiently distribute the conditioned air with a minimum of objectionable draft. The louvers 99 on the two front grills next to the driver's compartment are arranged to direct the air forwardly rather than rearwardly so as to provide adequate distribution to the front of the coach.

Figure 11:
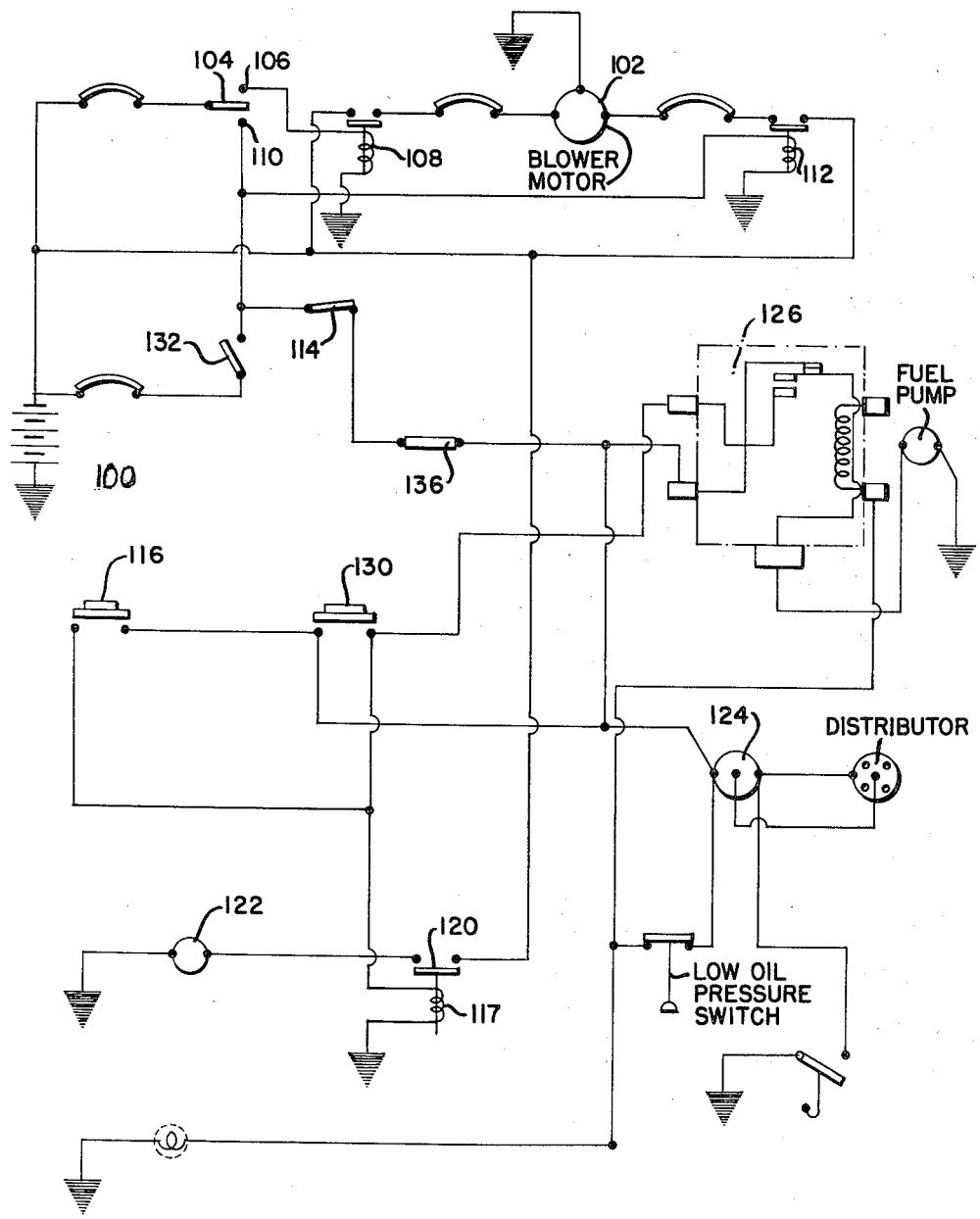
Figure 11 is a schematic circuit diagram showing the controls for the air conditioning equipment.

As shown in Figure 11 of the drawing, the storage battery 100 which is adapted to be connected to the conventional battery charging system (not shown) supplies current for operating the various air conditioning controls and the evaporator blower motor 102. The motor 102 is preferably of the two-speed type so that it is possible to operate the motor at a lower speed during the heating season than during the cooling season. Accordingly, this motor is controlled by means of a main summer-winter control switch 104 which is adapted to occupy any one of three positions. In its mid position as shown in Figure 8, the air conditioning equipment is shut off. By moving the control switch 104 upwardly the circuit will be closed to the heating contact 106 so as to energize the low speed fan switch operating solenoid 108. By moving the switch 104 downwardly the circuit will be closed to the contact 110 which not only energizes the high speed fan switch operating solenoid 112 but also closes the circuit to the engine control circuit in the manner shown in Figure 11. The engine control circuit includes a safety switch 114 located in the engine compartment which must be closed before the engine can be started. A first engine starting switch 116 which is preferably located in the driver's compartment of the bus is provided for closing the circuit to the cranking motor solenoid 117 which in turn serves to close the starting switch 120 arranged in series with the cranking motor 122. When the main heating and cooling switch 104 is set in the cooling position and the safety switch 114 is closed, the circuit is closed to the usual ignition coil 124 and also to the fuel pump relay mechanism which has generally been designated by the reference numeral 126. Inasmuch as the fuel pump relay and the ignition system are intended to designate conventional equipment the details of which form no part of this invention, it need not be described in greater detail.

A second starter switch 130 is located in the machinery compartment 37 and may be used for starting the motor from the machinery compartment. A test ignition switch 132 provided in the circuit as shown may be used by a repairman or the like desiring to start up the engine when the air conditioning control switch 104 which is preferably located in the driver's compartment is in the off position.

The switch 104 is arranged to be automatically opened by an actuator bar 134 located on the access door 38 whenever the access door is closed so as to make it possible for the bus driver to start and stop the engine from the driver's compartment.

The usual protective devices such as the high-low refrigerant pressure operated switch 136 are provided in accordance with well known practice.

While the form of embodiment of the invention as herein disclosed constitutes a preferred form, it is to be understood that other forms might be adopted, as may come within the scope of the claims which follow.

What is claimed is as follows:

1. In combination, a passenger vehicle having a passenger compartment, means forming a machinery compartment below said passenger compartment, air conditioning apparatus for cooling the air in said passenger compartment, said air conditioning apparatus including an evaporator, a compressor, a condenser, refrigerant flow connections between said evaporator, compressor and condenser, said compressor and condenser being mounted in said machinery compartment, said machinery compartment having an outside wall provided with an air passage, means for pivotally supporting said condenser adjacent said air passage so as to swing out from said machinery compartment, an engine for driving said compressor, said engine having main crankshaft extending substantially parallel to the side wall of said vehicle, a power take-off shaft projecting from said engine at right angles to said crankshaft, a condenser cooling fan adjacent said condenser and having a shaft arranged parallel to said power take-off shaft, and means for drivingly connecting said fan shaft to said power take-off shaft, said condenser being mounted between the one side of said vehicle and said condenser fan.

2. In combination, a passenger vehicle having a passenger compartment; means forming a machinery compartment adjacent said passenger compartment; air conditioning apparatus for cooling the air in said passenger compartment; said air conditioning apparatus including an evaporator, a compressor, a condenser and refrigerant flow connections between said evaporator, compressor and condenser; said compressor and condenser being mounted in said machinery compartment; means for supporting said condenser adjacent an outside wall of said vehicle; an engine for driving said compressor; said engine having a main crankshaft extending substantially parallel to the side wall of said vehicle; a power take-off shaft projecting from said engine at right angles to said shaft; a condenser cooling fan having a shaft arranged parallel to said power take-off shaft and perpendicular to said condenser; and means for drivingly connecting said shaft to said power take-off shaft, said condenser being mounted between the one side of said vehicle and said condenser fan; control means for said engine including a first ignition switch mounted in said machinery compartment and a second ignition switch mounted within said passenger compartment; a door for said machinery compartment; and means whereby closing of said door opens the first of said ignition switches.

3. In combination; a passenger vehicle having a passenger compartment; means forming a machinery compartment adjacent said passenger compartment; air conditioning apparatus for cooling the air in said passenger compartment; said air conditioning apparatus including an evaporator, a compressor, a condenser and refrigerant flow connections between said evaporator, compressor and condenser; said compressor and condenser being mounted in said machinery compartment; means for supporting said condenser adjacent an outside wall of said vehicle; an engine for driving said compressor; said engine having a main crankshaft extending substantially parallel to the side wall of said vehicle; a power take-off shaft projecting from said engine at right angles to said shaft; a condenser cooling fan having a shaft arranged parallel to said power take-off shaft and perpendicular to said condenser; and means for drivingly connecting said shaft to said power take-off shaft; said condenser supporting means including means for pivotally mounting said condenser for swinging movement into a plane at right angles to the side wall of said vehicle for condenser cleaning purposes.

4. In combination; a passenger vehicle having a passenger compartment; means forming a machinery compartment adjacent said passenger compartment; air conditioning apparatus for cooling the air in said passenger compartment; said air conditioning apparatus including an evaporator, a compressor, a condenser and refrigerant flow connections between said evaporator, compressor and condenser; said compressor and condenser being mounted in said machinery compartment; means for supporting said condenser adjacent an outside wall of said vehicle; an engine for driving said compressor; said engine having a main crankshaft extending substantially parallel to the side wall of said vehicle; a power take-off shaft projecting from said engine at right angles to said shaft; a condenser cooling fan having a shaft arranged parallel to said power take-off shaft and perpendicular to said condenser; and means for drivingly connecting said shaft to said power take-off shaft, said condenser being mounted between the one side of said vehicle and said condenser fan; control means for said engine including a first ignition switch mounted in said machinery compartment and a second ignition switch mounted within said passenger compartment; a door for said machinery compartment; means whereby closing of said door opens the first of said ignition switches; and a safety switch in said machinery compartment in series circuit relationship with said first ignition switch for preventing starting of said engine in one position of said safety switch.

5. In combination, a passenger vehicle having a passenger compartment, a machinery compartment, and an air tempering compartment, said machinery compartment and said air tempering compartment being located beneath said passenger compartment intermediate the front and rear ends of said vehicle, air conditioning apparatus for cooling the air in said passenger compartment, said air conditioning apparatus including an evaporator disposed within said air tempering compartment, a compressor, a condenser, refrigerant flow connections between said evaporator, compressor and condenser, said compressor and condenser being mounted in said machinery compartment, an engine within said machinery compartment drivingly connected to said compressor, a condenser cooling fan driven by said engine, said vehicle having condenser cooling air openings formed in one side and the bottom wall thereof whereby condenser cooling air may be circulated by said condenser cooling fan in thermal exchange relationship with said condenser, first duct means forming a first air passage extending transversely of said vehicle above said machinery compartment for conveying air to be conditioned into said air tempering compartment, said first duct means having a fresh air inlet communicating with the outside atmosphere adjacent the side of said vehicle and having return air inlet means through which air from said passenger compartment may be returned to said air tempering compartment, second duct means forming a second transversely extending air passage above said machinery compartment and having an inlet opening communicating with said air tempering compartment and having conditioned air outlets adjacent opposite sides of said passenger compartment, and a pair of longitudinally extending air distributing ducts above said first and second duct means communicating with said last named air outlets.

6. In combination, a passenger vehicle having a passenger compartment, a machinery compartment, and an air tempering compartment, air conditioning apparatus for cooling the air in said passenger compartment, said air conditioning apparatus including an evaporator disposed within said air tempering compartment, a compressor, a condenser, and refrigerant flow connections between said evaporator, compressor and condenser, said compressor and condenser being mounted in said machinery compartment, means including a fan for circulating air in thermal exchange relationship with said condenser, means forming a pair of air passages extending transversely of said vehicle for conveying air to and from said air tempering compartment, one of said air passages having a fresh air inlet communicating with the outside atmosphere adjacent the side of said vehicle and having return air inlet means communicating with said passenger compartment whereby a mixture of fresh air and return air is conveyed to said air tempering compartment, another of said air passages having an inlet opening communicating with said air tempering compartment and having conditioned air outlets adjacent opposite sides of said passenger compartment, longitudinally extending air distributing ducts communicating with said last named air outlets, and vertically extending branch ducts leading upwardly from said last named ducts for distributing the conditioned air into said passenger compartment substantially at lap height.

7. In combination, a passenger vehicle having a passenger compartment, a machinery compartment having an air inlet and an air outlet for condenser cooling air, and an air tempering compartment having an inlet for air to be conditioned and an outlet for conditioned air, said machinery compartment and said air tempering compartment being located beneath said passenger compartment intermediate the front and rear ends of said vehicle air conditioning apparatus for cooling the air in said passenger compartment, said air conditioning apparatus including an evaporator disposed within said air tempering compartment, and compressor, a condenser, and refrigerant flow connections between said evaporator, compressor and condenser, a condenser cooling fan, said compressor, condenser, and fan being mounted in said machinery compartment, an engine within said machinery compartment drivingly connected to said fan and to said compressor, said vehicle having a first condenser cooling air passage formed in one side thereof adjacent said condenser and having a second condenser cooling air passage in its bottom wall whereby condenser cooling air may be circulated by said condenser cooling fan in thermal exchange relationship with said condenser, means forming a pair of air passages extending transversely of said vehicle above said machinery and air tempering compartments for conveying air to be conditioned to and from said air tempering compartment, one of said air passages terminating in fresh air inlets communicating with the outside atmosphere adjacent opposite sides of said vehicle and having return air inlet means through which air from said passenger compartment may be returned to said air tempering compartment, a second of said transversely extending air passages having an inlet opening communicating with said conditioned air outlet and having conditioned air outlets adjacent opposite sides of said passenger compartment, longitudinally extending air distributing ducts within said passenger compartment communicating with said last named air outlets, and a plurality of spaced vertically extending branch ducts for distributing the conditioned air into said passenger compartment.

8. In combination, a passenger vehicle having a passenger compartment, a machinery compartment having an air inlet and an air outlet for condenser cooling air, and an air tempering compartment having an inlet for air to be conditioned and an outlet for conditioned air, said machinery compartment and said air tempering compartment being located beneath said passenger compartment intermediate the front and rear ends of said vehicle air conditioning apparatus for cooling the air in said passenger compartment, said air conditioning apparatus including an evaporator disposed within said air tempering compartment, a compressor, a condenser, and refrigerant flow connections between said evaporator, compressor and condenser, a condenser cooling fan, said compressor, condenser, and fan being mounted in said machinery compartment, an engine within said machinery compartment drivingly connected to said fan and to said compressor, said vehicle having a first condenser cooling air passage formed in one side thereof adjacent said condenser and having a second condenser cooling air passage in its bottom wall whereby condenser cooling air may be circulated by said condenser cooling fan in thermal exchange relationship with said condenser, means forming a pair of air passages extending transversely of said vehicle above said machinery and air tempering compartments for conveying air to be conditioned to and from said air tempering compartment, one of said air passages terminating in fresh air inlets communicating with the outside atmosphere adjacent opposite sides of said vehicle and having return air inlet means through which air from said passenger compartment may be returned to said air tempering compartment, a second of said transversely extending air passages having an inlet opening communicating with said conditioned air outlet and having conditioned air outlets adjacent opposite sides of said passenger compartment, longitudinally extending air distributing ducts within said passenger compartment communicating with said last named air outlets, and a plurality of spaced vertically extending branch ducts for distributing the conditioned air into said passenger compartment, said branch ducts having air directing grills carried thereby, said air grills comprising a first set of louvers for directing a first portion of the conditioned air against the side walls of said passenger compartment, a second set of louvers for directing air in substantially a horizontal direction towards the center of said passenger compartment, and a third set of louvers for directing air at an angle upwardly and rearwardly adjacent the side wall of said passenger compartment.

9. In combination, a passenger vehicle having a passenger compartment, a machinery compartment, and an air tempering compartment, air conditioning apparatus for cooling the air in said passenger compartment, said air conditioning apparatus including an evaporator disposed within said air tempering compartment, a compressor, a condenser, and refrigerant flow connections between said evaporator, compressor and condenser, said compressor and condenser being mounted in said machinery compartment, means including a fan for circulating air in thermal exchange relationship with said condenser, means forming a pair of air passages extending transversely of said vehicle for conveying air to and from said air tempering compartment, one of said air passages having a fresh air inlet communicating with the outside atmosphere adjacent the side of said vehicle and having return air inlet means communicating with said passenger compartment whereby a mixture of fresh air and return air is conveyed to said air tempering compartment, another of said air passages having an inlet opening communicating with said air tempering compartment and having conditioned air outlets adjacent opposite sides of said passenger compartment, longitudinally extending air distributing ducts communicating with said last named air outlets, and vertically extending branch ducts leading upwardly from said last named ducts for distributing the conditioned air into said passenger compartment substantially at lap height, said branch ducts having air directing grills carried thereby, said air grills comprising a first set of louvers for directing a first portion of the conditioned air against the side walls of said passenger compartment, a second set of louvers for directing air in substantially a horizontal direction towards the center of said passenger compartment, and a third set of louvers for directing air at an angle upwardly and rearwardly adjacent the side wall of said passenger compartment.

10. In combination, a passenger vehicle having a passenger compartment, a machinery compartment, and an air tempering compartment, air conditioning apparatus for cooling the air in said passenger compartment, said air conditioning apparauts including an evaporator disposed within said air tempering compartment, a compressor, a condenser, and refrigerant flow connections between said evaporator, compressor and condenser, said compressor and condenser being mounted in said machinery compartment, means including a fan for circulating air in thermal exchange relationship with said condenser, means forming a pair of air passages for conveying air to and from said air tempering compartment, one of said air passages having a fresh air inlet communicating with the outside atmosphere and having return air inlet means communicating with said passenger compartment whereby a mixture of fresh air and return air is conveyed to said air tempering compartment, another of said air passages having an inlet opening communicating with said air tempering compartment and having conditioned air outlets adjacent opposite sides of said passenger compartment, longitudinally extending air distributing ducts communicating with said last named air outlets, and vertically extending branch ducts leading upwardly from said last named ducts for distributing the conditioned air into said passenger compartment substantially at lap height.

References Cited in the file of this patent

UNITED STATES PATENTS

| 2,053,206 | Sargent | Sept. 1, 1936 |
| 2,382,667 | Ryan | Aug. 14, 1945 |
| 2,636,356 | Ryan | Apr. 28, 1953 |

FOREIGN PATENTS

| 19,575 | Great Britain | Aug. 11, 1910 |